(12) United States Patent
You et al.

(10) Patent No.: US 11,474,301 B2
(45) Date of Patent: Oct. 18, 2022

(54) DEVICE FOR COMMUNICATION

(71) Applicant: Advanced Semiconductor Engineering, Inc., Kaohsiung (TW)

(72) Inventors: Chang-Feng You, Kaohsiung (TW); Jr-Wei Lin, Kaohsiung (TW); Chieh-Chen Fu, Kaohsiung (TW); Kao-Ming Su, Kaohsiung (TW); Chen Yuan Weng, Kaohsiung (TW)

(73) Assignee: ADVANCED SEMICONDUCTOR ENGINEERING, INC., Kaosiung (TW)

( * ) Notice: Subject to any disclaimer, the term of this patent is extended or adjusted under 35 U.S.C. 154(b) by 0 days.

(21) Appl. No.: 17/144,114

(22) Filed: Jan. 7, 2021

(65) Prior Publication Data

US 2022/0214488 A1 Jul. 7, 2022

(51) Int. Cl.
*G02B 6/36* (2006.01)
*G02F 1/1337* (2006.01)
*G02F 1/29* (2006.01)
*G02F 1/133* (2006.01)

(52) U.S. Cl.
CPC ..... *G02B 6/3652* (2013.01); *G02F 1/133776* (2021.01); *G02F 1/29* (2013.01); *G02F 1/13318* (2013.01)

(58) Field of Classification Search
CPC .... G02B 6/003; G02B 6/0023; G02B 6/0013; G02B 6/3652; G02B 6/0021; G02B 6/0091; G02B 6/32; G02B 7/04; G02B 6/4204; G02B 6/4206; G02B 19/0061; G02B 19/0076; G02B 19/0085; G02B 27/0955; G02B 27/095; G02B 27/0938; G02B 26/08; G02B 26/0875; G02B 6/00; G02F 1/133607; G02F 1/133615; G02F 1/1336; G02F 1/133; G02F 1/29; G02F 1/1337; G02F 1/133776
USPC ............... 349/62; 385/52; 372/107
See application file for complete search history.

(56) References Cited

U.S. PATENT DOCUMENTS

| 4,762,386 A | * | 8/1988 | Gordon | G02B 6/4248 385/84 |
| 4,904,063 A | * | 2/1990 | Okada | G02F 1/133371 349/200 |
| 4,969,704 A | * | 11/1990 | Stanley | G02B 6/4248 385/52 |
| 4,997,279 A | * | 3/1991 | Gordon | G02B 6/4248 356/153 |
| 5,062,117 A | * | 10/1991 | Anthon | H01S 3/09415 372/75 |
| 5,150,234 A | * | 9/1992 | Takahashi | A61B 1/0019 349/1 |

(Continued)

*Primary Examiner* — Alexander K Garlen
*Assistant Examiner* — James M Endo
(74) *Attorney, Agent, or Firm* — Foley & Lardner LLP

(57) ABSTRACT

A device is provided. The device may be an optical device, a light coupling device, or a tunable light coupling device. The device includes a first portion, a lens, a light emitting element, and a waveguide. The first portion is disposed adjacent to a surface of a substrate and has a first side and a second side opposite to the first side. The light emitting element is disposed adjacent to the second side of the first portion. The lens is disposed adjacent to the first side of the first portion and between the light emitting element and the waveguide.

10 Claims, 12 Drawing Sheets

(56) References Cited

U.S. PATENT DOCUMENTS

| | | | | |
|---|---|---|---|---|
| 6,219,470 B1* | 4/2001 | Tu | ................. | G02B 6/4246 385/83 |
| 6,345,139 B1* | 2/2002 | Fuse | ................. | G02B 6/421 385/52 |
| 6,481,130 B1* | 11/2002 | Wu | ................. | F21V 13/04 362/297 |
| 6,600,760 B1* | 7/2003 | Green | ................. | G02B 26/002 372/20 |
| 6,765,948 B2* | 7/2004 | Murry | ................. | G02B 6/4214 372/107 |
| 6,842,467 B1* | 1/2005 | Aronson | ................. | H01S 5/02251 385/11 |
| 6,920,168 B1* | 7/2005 | Meyers | ................. | G02B 6/4215 372/50.21 |
| 7,486,846 B2* | 2/2009 | Warashina | ................. | G02B 6/4246 385/14 |
| 9,213,155 B2* | 12/2015 | Miao | ................. | G02B 6/424 |
| 10,107,975 B1* | 10/2018 | Lam | ................. | G02B 6/4204 |
| 10,162,111 B1* | 12/2018 | Lebby | ................. | G02B 6/4248 |
| 10,193,302 B2* | 1/2019 | Lin | ................. | H01S 5/0234 |
| 2005/0069261 A1* | 3/2005 | Arayama | ................. | G02B 6/423 385/52 |
| 2005/0111797 A1* | 5/2005 | Sherrer | ................. | G02B 6/4206 385/93 |
| 2007/0003189 A1* | 1/2007 | Kaneko | ................. | G02B 6/4204 385/39 |
| 2008/0166136 A1* | 7/2008 | Birincioglu | ................. | G02B 6/4214 398/212 |
| 2010/0266241 A1* | 10/2010 | Hosoda | ................. | G02B 6/4201 385/49 |
| 2014/0104541 A1* | 4/2014 | Park | ................. | G02B 6/0023 349/62 |
| 2016/0202420 A1* | 7/2016 | Paquet | ................. | G02F 1/137 385/33 |
| 2017/0059961 A1* | 3/2017 | Park | ................. | G02F 1/1334 |
| 2017/0242208 A1* | 8/2017 | Lee | ................. | G02B 6/424 |
| 2018/0376562 A1* | 12/2018 | Peng | ................. | G02B 19/0061 |
| 2019/0101791 A1* | 4/2019 | Chen | ................. | G02F 1/29 |

* cited by examiner

DEVICE FOR COMMUNICATION

BACKGROUND

1. Technical Field

The present disclosure relates to a device and, more particularly, to a device including an optical structure for communication.

2. Description of the Related Art

Optical coupling are communications between light sources and other components (e.g., photodetectors). For example, an optical coupling device can be used to couple light from an optical fiber into an optical detector. Unfortunately, this optical coupling process may exhibit poor coupling efficiency, with a large part of the redirected light not reaching the detector. There exists a need to develop a device of efficient optical coupling.

SUMMARY

In an aspect, a device includes a first portion, a lens, a light emitting element, and a waveguide. The first portion is disposed adjacent to a surface of a substrate and has a first side and a second side opposite to the first side. The light emitting element is disposed adjacent to the second side of the first portion. The lens is disposed adjacent to the first side of the first portion and between the light emitting element and the waveguide.

In an aspect, a device includes a lens. The lens is embedded in a substrate and is adjustable to converge light emitted into a predetermined portion of the lens.

DETAILED DESCRIPTION

Figure 1A:
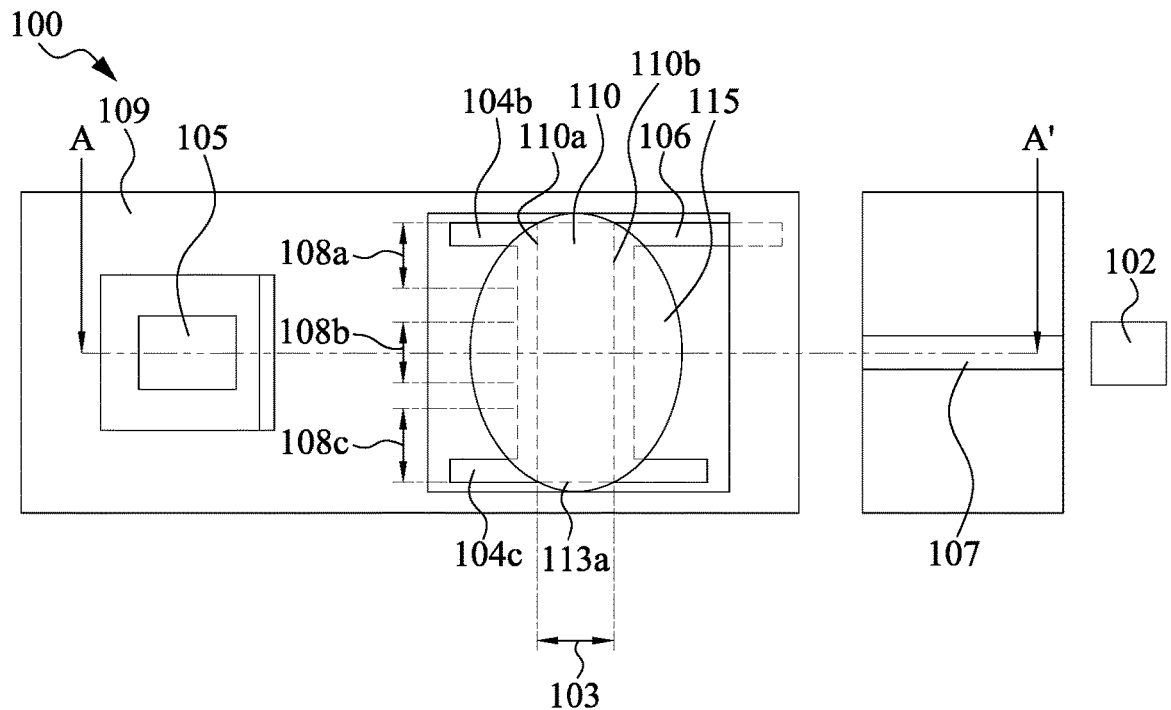
FIG. 1(a) illustrates a top view of an example device according to an embodiment of the present disclosure.

Spatial descriptions, such as "above," "top," and "bottom" and so forth, are indicated with respect to the orientation shown in the figures unless otherwise specified. It should be understood that the spatial descriptions used herein are for purposes of illustration only, and that practical implementations of the structures described herein can be spatially arranged in any orientation or manner, provided that the merits of embodiments of this disclosure are not deviated by such arrangement.

There is a continuing demand to reduce (i.e. miniaturize) a size of a light emitting element and a waveguide coupled to the light emitting element in a semiconductor device (e.g., a silicon photonic device). Meanwhile, the size (e.g., a thickness) of the light emitting element may be much greater than the size (e.g., a thickness) of the waveguide. As such, it is extremely difficult to precisely control the relative position of the light emitting element to the waveguide and to dispose the light emitting element at the appropriate position while also disposing it as close as possible to the waveguide. For example, in some embodiments, the light emitting element may not be able to be disposed upright from a surface of a substrate and the central axis of the light emitting element may be tilted from a central axis of the waveguide by an angle. Such misalignments are the reasons why the light coupling efficiency is low; i.e., the light emitted from the light emitting element is shifted by the location shift of the light emitting element and less light may thus enter the waveguide effectively. Tremendous amounts of time and complicated processes may be required to relocate the light emitting element so as to reduce such misalignments and improve the light coupling efficiency. For example, a lens may be disposed between the light emitting element and the waveguide to help to direct light generated from the light emitting element to the waveguide. Nevertheless, as a size of the lens is also extremely small (e.g., nanometer degree), disposing the lens at the appropriate position may encounter the same problem as disposing the light emitting element does as it is also extremely difficult to precisely control the relative position of the lens to the light emitting element and to the waveguide. If the location of the lens is shifted, it may not direct light generated from the light emitting element along an appropriate direction, e.g., toward the waveguide, and may not achieve its intended purpose.

Given the above and other reasons, it would be desirable to provide a device that can improve light coupling efficiency and at the same time satisfy the miniaturization requirement.

In some embodiments, the present disclosure provides a device including a light emitting element and a lens. The lens is adjustable to converge light emitted into a predetermined portion of the lens toward a predetermined area, e.g., a waveguide in such a manner that the light coupling efficiency is improved.

FIG. 1(a) illustrates a top view of a device 100 according to an embodiment of the present disclosure. The device 100 of FIG. 1(a) may be an optical device, a light coupling device, or a tunable light coupling device. The device 100 may include a lens 103 and a light emitting element 105.

The lens 103 is adjustable to, during use, converge light emitted into a predetermined portion of the lens 103 (e.g., light generated by the light emitting element 105) toward a predetermined area, for example, an area substantially aligned with a light receiving area of a waveguide 107. The lens 103 may be capable of adjusting so it converges the emitted light into the predetermined area. During use, the focal point, working distance, or direction of light may be adjustable by tuning the lens 103. Such tuning of the lens 103 can avoid calibrating processes for disposing a lens or the light emitting element 105 at an appropriate position. The lens 103 may be tuned by modifying a driving signal provided thereto via a control circuit (not shown). Modifying the driving signal can include modifying its frequency, its amplitude, its voltage, and/or any combination thereof. To do so, the control circuit may be electrically connected to a light detector 102 and control electrodes 104b, 104c, 106 to control the lens 103 in response to the feedback of the light detector 102. In some embodiments, the lens 103 can be tuned by modifying the voltage of the electrodes 104b, 104c, 106 of the device 100.

The predetermined portion of the lens 103 may correspond to a portion of the lens reached by a main part of the emitted light. For example, if it is detected by the light detector 102 that a main part of an emitted light may deviate from the path toward a predetermined area, e.g., the waveguide 107 before reach it, the light detector 102 may send a signal to the control circuit. Then, the control circuit may determine which portion of the lens 103 are reached by the main part of the emitted light and activate it to converge the light toward the predetermined area.

The emitted light from the light emitting element 105 may be assumed to be Gaussian light with an irradiance profile that follows a Gaussian distribution in general. Gaussian irradiance profile may be symmetric around the center of the emitted light and decrease as the distance from the center of the emitted light. Therefore, if the light intensity at the center of the Gaussian irradiance profile is defined as 100% and decrease from the center, a "main part" of the emitted light may refer to a light having an intensity having a profile from 100% to 10%, from 100% to 20%, from 100% to 30%, from 100% to 40%, or 100% to 50%, 100% to 60%, 100% to 70%, 100% to 80%, 100% to 90% of the Gaussian irradiance profile.

In addition, the light detector 102 may detect the light intensity of the light, and send a signal to the control circuit to determine whether the light intensity of the light propagating along an appropriate direction toward the predetermined area is sufficient. If it is not, the control circuit may activate one or more sectors 108a, 108b, 108c of the lens 103 to direct more light toward the predetermined area. As a result, the light intensity of the light toward the predetermined area may be enhanced by activating one or more of the tunable optical sectors 108a, 108b, 108c of the lens 103 to direct light to them.

Figure 1B:
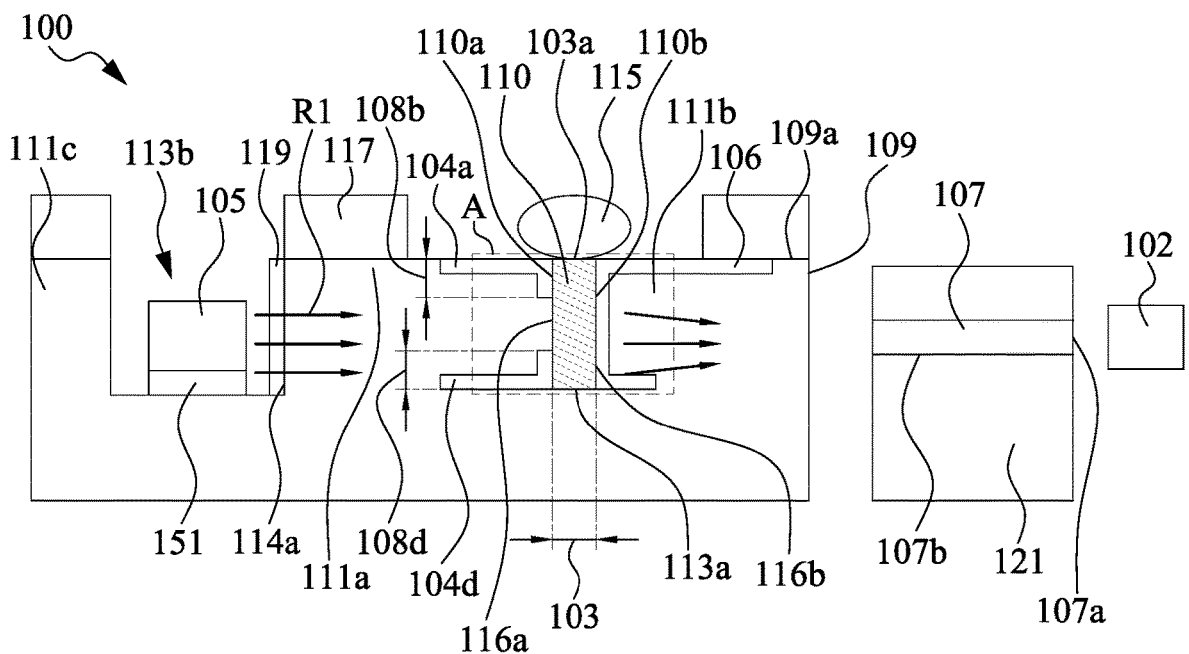
FIG. 1(b) illustrates a cross-sectional view of section A-A' of the device of FIG. 1(a) according to an embodiment of the present disclosure.

FIG. 1(b) illustrates a cross-sectional view of section A-A' of the device 100 according to an embodiment of the present disclosure. The lens 103 may be disposed adjacent to a surface 109a of a substrate 109. The lens 103 may be disposed adjacent to a first side 116a of the first portion 111a disposed adjacent to the surface 109a of a substrate 109. The lens 103 may be disposed in the substrate 109. The lens 103 may be embedded in the substrate 109. The lens 103 may be an electrically tunable lens. In some embodiments, the lens 103 is a liquid crystal lens. The lens 103 may include a liquid crystal module comprising a plurality of pixels that are operable to converge light into a predetermined area. For example, the lens 103 may include a plurality of sectors 108a, 108b, 108c and the sector 108a, 108b, 108c may be a pixel of a liquid crystal module.

Each of the plurality of the sectors 108b, 108d may receive a respective signal from a control circuit and control the corresponding tunable optical materials 110 to react accordingly. Thus, the sectors 108b, 108d may act independently and work with other sectors to direct light R1 toward a certain direction. Since the plurality of the sectors 108b, 108d are individually driven and may receive different signals, each of the plurality of the sectors 108b, 108d may direct light R1 in a different manner and to propagate along a different direction. That is, each of the sectors 108b, 108d may coordinate with each other to direct light R1 to point to a predetermined area. The plurality of the sectors 108b, 108d may be arranged in such a manner to direct light R1 generated from the light emitting element 105 toward a certain direction or a predetermined area. In some embodiments, the plurality of the sectors 108b, 108d are arranged in such a manner to direct light R1 generated from the light emitting element 105 to a focal point, along a certain direction, or to a predetermined area, e.g., to a waveguide 107. The plurality of the sectors 108b, 108d may be arranged in the form of a line, a ring, an array, an arc, a sphere surface, an ellipse surface, or any combination thereof. Each of the plurality of the sectors 108b, 108d may include at least one first electrode 104a, 104d, a tunable optical material 110, and a second electrode 106.

The first electrode 104a, 104d may be disposed adjacent to a first side 110a of the tunable optical material 110. The first electrode 104a, 104d may be disposed between the first portion 111a and a second portion 111b disposed adjacent to the surface 109a of the substrate 109. The first electrode 104a, 104d may be disposed adjacent to the surface 109a of the substrate 109. The first electrode 104a, 104d may be disposed in the substrate 109. The first electrode 104a, 104d may be disposed in the first portion 111a of the substrate 109. In some embodiments, the first electrode 104a, 104d is disposed in the first portion 111a of the substrate 109 and adjacent to the first side 110a of the tunable optical material 110.

The first electrode 104a, 104d corresponds to a tunable optical material 110. The first electrode 104a, 104d is operable to control a respective tunable optical material 110 to change the alignment of its point direction (hereinafter referred to as "director") with the counterpart second electrode 106. The first electrode 104a, 104d may modify the alignment of the director of the respective tunable optical material 110 by modifying an electric field to the tunable optical material 110, e.g., by modifying its amplitude, its voltage, and/or any combination thereof. A plurality of the first electrodes 104a, 104d may be arranged in the first portion 111a of the substrate 109 in the form of a line, a ring, an array, an arc, a sphere surface, an ellipse surface, or any combination thereof.

The tunable optical material 110 may be disposed adjacent to the surface 109a of the substrate 109. The tunable optical material 110 may be disposed in the substrate 109. The tunable optical material 110 may be embedded in the substrate 109. The tunable optical material 110 may be disposed in a first cavity 113a of the substrate 109. The tunable optical material 110 may fill the first cavity 113a of the substrate 109 and exhibit the shape of an opening of the first cavity 113a from the top view. In some embodiments, the tunable optical material 110 has a vertical projection rectangular area. In some embodiments, the tunable optical material 110 has a vertical projection circular area. The first cavity 113a may be disposed between the first portion 111a and the second portion 111b. In some embodiments, the tunable optical material 110 is disposed in the first cavity 113a of the substrate 109 and between the first portion 111a and a second portion 111b of the substrate 109.

The tunable optical material 110 may include a molecule that may align its director with an electric field being applied. If light is linearly polarized before it enters the molecule, meaning that the light is only allowed to oscillate in one direction, it is more likely that the polarized light will shift its propagation direction in some fashion by the director of the molecule. Therefore, the shifting degree or the propagation direction of the polarized light may be determined and controlled by propagating light through the tunable optical material 110 and by modifying an electric field to it, e.g., by modifying its amplitude, its voltage, and/or any combination thereof. In some embodiments, the tunable optical material 110 includes a liquid crystal material. The liquid crystal material may include, for example, a twisted nematic (TN) liquid crystal, a vertical alignment (VA) liquid crystal, or an in-plane-switching (IPS) liquid crystal. In some embodiments, the liquid crystal material includes a TN liquid crystal.

The second electrode 106 is separated from the first electrode 104a, 104d. The second electrode 106 may be separated from the first electrode 104a, 104d by the tunable optical material 110. The second electrode 106 is disposed adjacent to a second side 110b of the tunable optical material 110, which is opposite to the first side 110a of the tunable optical material 110. The second electrode 106 may be disposed adjacent to the surface 109a of the substrate 109. The second electrode 106 may be disposed in the substrate 109. The second electrode 106 may be disposed in a second portion 111b of the substrate 109. The second electrode 106 may form as a whole and correspond to a plurality of the first electrodes 104a, 104d. Alternatively, the second electrode 106 may be divided into different sections corresponding to each of the plurality of the first electrodes 104a, 104d. In some embodiments, the second electrode 106 works with the first electrode 104a, 104d and constitutes the sector 108b, 108d with the tunable optical material 110 so the sector may be operable to direct light generated from the light emitting element 105 to propagate along a direction. The second electrode 106 may be arranged in the second portion 111b of the substrate 109 corresponding to the arrangement of the first electrode 104a, 104d, for example, in the form of a line, a round surface, a ring, an array, an arc, a sphere surface, an ellipse surface, or any combination thereof.

In some embodiments, the first portion 111a and the second portion 111b are parts of the substrate 109 and define the first cavity 113a, the first electrode 104a, 104d is disposed in the first portion 111a, the tunable optical material 110 is disposed in the first cavity 113a, and the second electrode 106 is disposed in the second portion 111b.

The light emitting element 105 aims to provide light. The light emitting element 105 should be disposed at a position so that light emitted from the light emitting element 105 may enter the waveguide 107. The light emitting element 105 may be separated from the lens 103 by the first portion 111a disposed adjacent to the surface 109a of the substrate 109. The light emitting element 105 may be disposed adjacent to a second side 114a of the first portion 111a. The light emitting element 105 may be disposed between the first portion 111a and a third portion 111c disposed adjacent to the surface 109a of the substrate 109. The light emitting element 105 may be disposed on a conductive pattern 151 in a second cavity 113b defined by the first portion 111a and the third portion 111c. The light emitting element 105 may be operable to transmit light through the first portion 111a of the substrate 109 to the lens 103. The light emitting element 105 may emit light having a wavelength in a range of about 1250 nm to about 1600 nm so the light may transmit through the first portion 111a and the second portion 111b of the substrate 109 including silicon toward a predetermined area, e.g., the waveguide 107. The light emitting element 105 may emit light having a wavelength of about 1250 nm, about 1300 nm, about 1350 nm, about 1400 nm, about 1450 nm, about 1500 nm, 1550 nm, and about 1600 nm. In some embodiments, the light emitting element 105 emits light having a wavelength of 1300 nm or 1500 nm.

A thickness of the light emitting element 105 may be smaller than that of the lens 103. By disposing the light emitting element 105 and the lens 103 in such a manner, the lens 103 may cover the light emitted from the light emitting element 105 as much as possible. Since the lens 103 may modify the propagation direction of the light by sectors, whether the light emitting element 105 is tilted or placed at an appropriate position, or emits light toward an appropriate direction or region of the lens 103 becomes less relevant as sectors of the lens 103 may direct light toward an appropriate direction. In addition, whether the lens 103 is tilted or placed at a precise position may also not affect the convergent of the light as the lens 103 is adjustable and may control the sectors and change its propagation direction toward an appropriate direction respectively depending on the position and amount of light received by the sectors.

In some embodiments, a cover material 115 may be further included in the device 100. The cover material 115 may be disposed adjacent to the lens 103. The cover material 115 may be disposed adjacent to a top surface 103a of the lens 103. The cover material 115 may cover a portion of the top surface 103a of the lens 103. The cover material 115 may seal the first cavity 113a. In some embodiments, the cover material 115 covers the tunable optical material 110 and exposes a portion of the first electrode 104a and a portion of the second electrode 106 of the lens 103. The cover material 115 may include a sealant.

In some embodiments, a dielectric layer 117 may be further included in the device 100. The dielectric layer 117 may be disposed adjacent to a top surface of the first portion 111a, the second portion 111b, and/or the third portion 111c of the substrate 109. In some embodiments, the dielectric layer 117 is disposed on at least a portion of the top surface of the first portion 111a and at least a portion of the top surface of the second portion 111b and expose the cover material 115 and a portion of the first electrode 104a and a portion of the second electrode 106. In some embodiments, the dielectric layer 117 is disposed on at least a portion of the top surface of the first portion 111a and on at least a portion of the top surface of the third portion 111c and exposes the second cavity 113b. In some embodiments, the dielectric layer 117 exposes the second cavity 113b, the cover material 115, a portion of the first electrode 104a, and a portion of the second electrode 106.

In some embodiments, a polarizer 119 may be further included in the device 100. The polarizer 119 may be disposed between the light emitting element 105 and the lens 103. The polarizer 119 may be disposed adjacent to the second side 114a of the first portion 111a of the substrate 109. The polarizer 119 may be disposed on the second side 114a of the first portion 111a of the substrate 109. In some embodiments, the polarizer 119 is disposed in the second cavity 113b defined by the first portion 111a and the third portion 111c and adjacent to the second side 114a of the first portion 111a. The polarizer 119 may be operable to polarize light so the light will shift the direction of propagation in some fashion by the lens 103.

In some embodiments, a waveguide 107 may be further included in the device 100. The waveguide 107 may be used to transmit light toward a certain direction, e.g., toward a light detector 102. Depending on the application, the waveguide 107 may be used to direct the light from different directions toward the same horizontal direction or toward the same vertical direction. The waveguide 107 may be separated from the lens 103 by the second portion 111b of the substrate 109. The lens 103 may be disposed between the light emitting element 105 and the waveguide 107. The waveguide 107 may be disposed in a substrate 121 different from the substrate 109 including the lens 103. In addition, the waveguide 107 may be disposed in a device different from the one including the lens 103.

In some embodiments, an alignment film for aligning the director of the electrically tunable optical materials 110 along a predetermined direction may be further included in the device 100. The alignment film may be disposed adjacent to a sidewall 116a, 116b of the first cavity 113a of the substrate 109. In some embodiments, the alignment film is disposed on the sidewall 116a, 116b of the first cavity 113a of the substrate 109.

In some embodiments, a light detector 102 for detecting the light intensity generated by the light emitting element 105 and determining which region requires more light and which region does not and providing such information to a control circuit (not shown) may be further included in the device 100. The light detector 102 may be disposed adjacent to the waveguide 107. The light detector 102 may be disposed between the lens 103 and the waveguide 107. The light detector 102 may be disposed adjacent to the light output surface 107a of the waveguide 107.

Please note that some elements of the device may be omitted from the following drawings for brevity and ease of discussion.

Figure 1C:
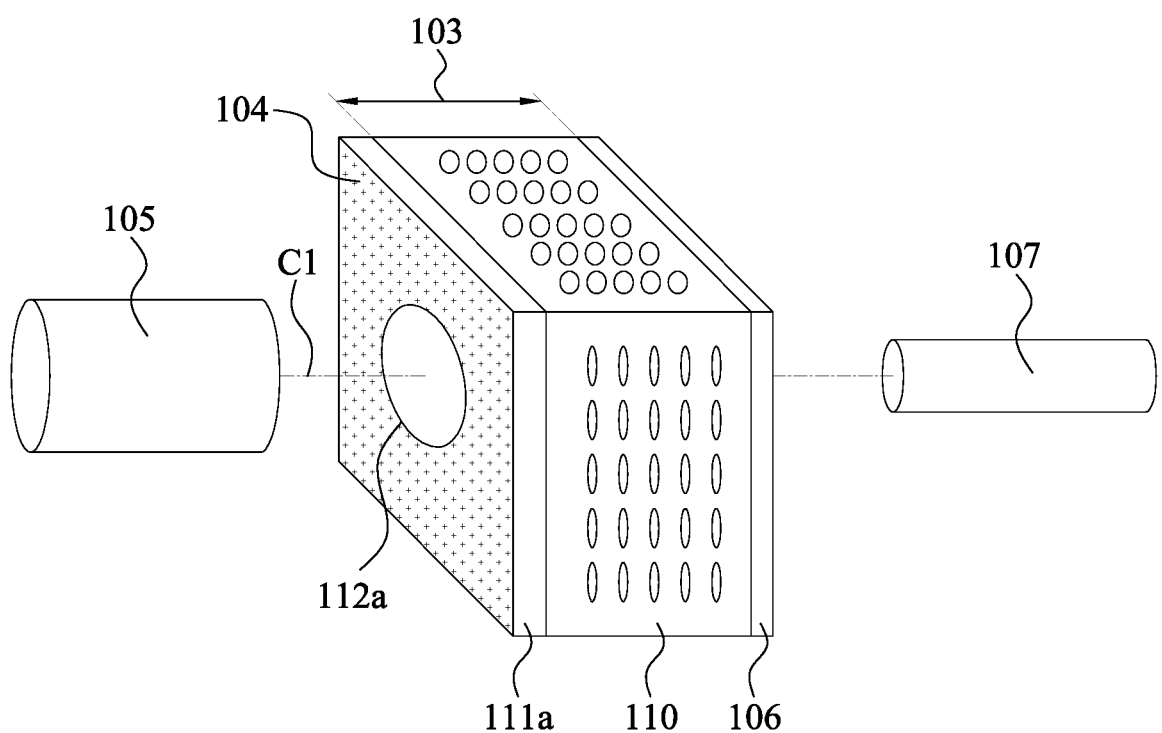
FIG. 1(c) illustrates an exploded view of the device of FIG. 1(a) according to an embodiment of the present disclosure.

FIG. 1(c) illustrates an exploded view of the device 100 according to an embodiment of the present disclosure. As shown in FIG. 1(c), the first electrode region 104 may surround a central axis C1 of the lens 103 and surround a portion 112a of the first portion 111a so the lens 103 may include an active region 104 including the first electrode region 104, the tunable optical material 110, and the second electrode 106 and an inactive region 112a, where the active region 104 surrounds the inactive region 112a. By disposing the lens 103 with such structure, light reaching outside the center portion 112a may reach the active region 104 of the lens 103 and be redirected to an appropriate direction by applying an electric field to the active region 104 of the lens 103 and make the corresponding tunable optical material 110 to change the light path accordingly. FIG. 1(c) is merely for illustration purpose. It should be noted that the first electrode region 104 may comprise a plurality of first electrodes 104a, 104b, 104c, 104d as illustrated in FIG. 1(a) and FIG. 1(b) corresponding to a plurality of sectors 108a, 108b, 108c as illustrated in FIG. 1(a) and sector 108d as illustrated in FIG. 1(b).

Figure 2A:
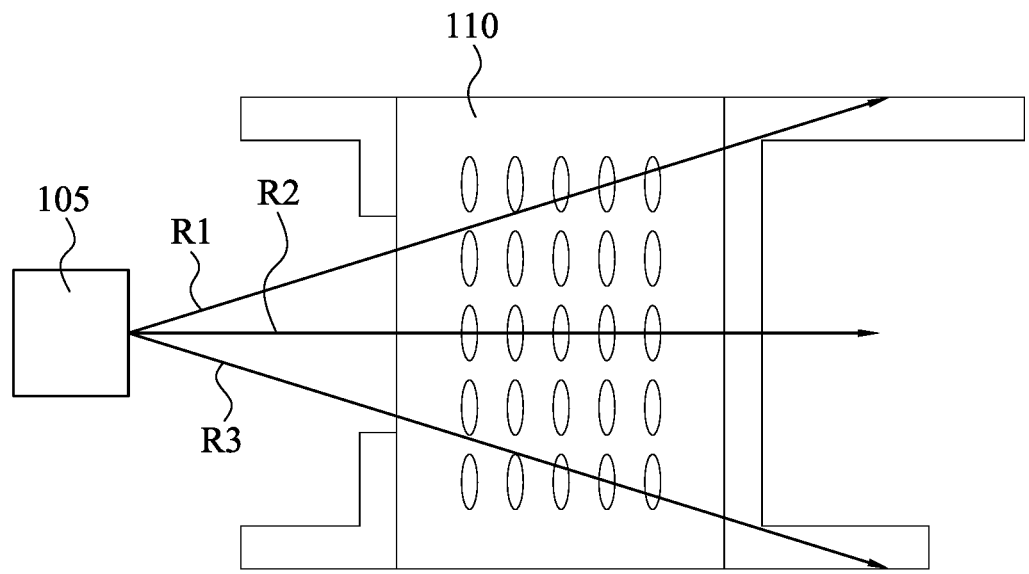
FIG. 2(a) illustrates an enlarged view of a cross-section view of region A of the device of FIG. 1(a) according to an embodiment of the present disclosure.

FIG. 2(a) illustrates an enlarged view of a cross-section view of region A of the device 100 of FIG. 1(b) according to an embodiment of the present disclosure, where no tunable optical sectors are activated, meaning that no electric field is applied to the tunable optical material 110. As shown in FIG. 2(a), since no electric field is applied to the tunable optical material 110, the director of the tunable optical material 110 is not changed, so the light R1, R2, R3 generated from the light emitting element 105 will not change its propagation direction and remain the same path. Therefore, light R1, R3 that does not travel along an appropriate direction or toward a predetermined area, e.g., toward the waveguide 107 may not change its path and does not enter the waveguide 107.

Figure 2B:
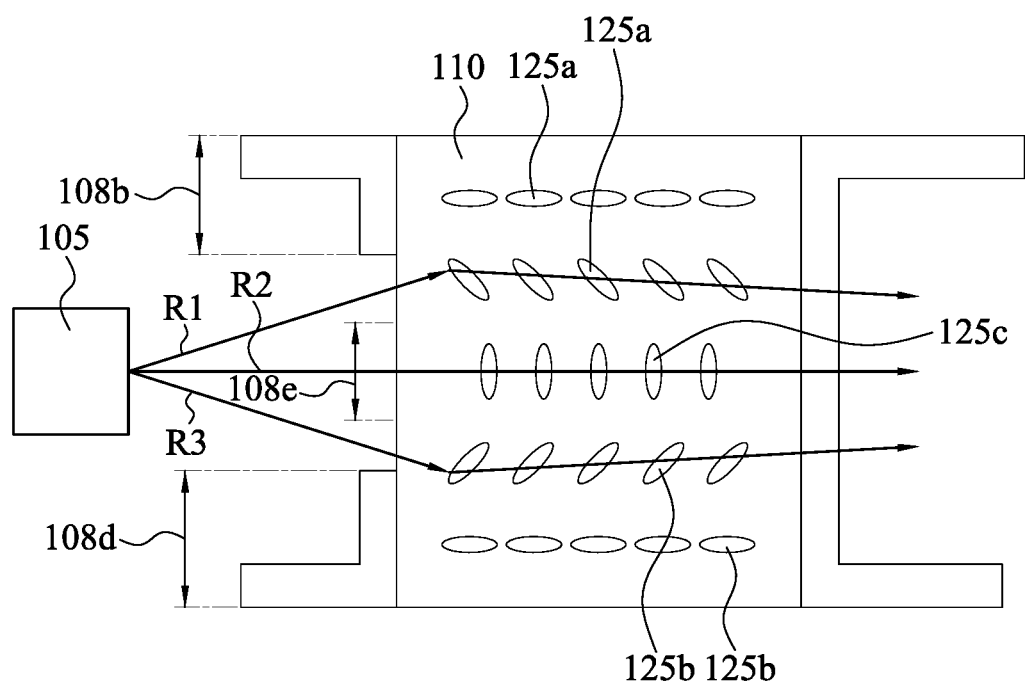
FIG. 2(b) illustrates an enlarged view of a cross-section view of region A of the device of FIG. 1(a) according to an embodiment of the present disclosure.

FIG. 2(b) illustrates an enlarged view of a cross-section view of region A of the device 100 of FIG. 1(b) according to an embodiment of the present disclosure, where a first sector 108b and a second sector 108d are activated and a third sector 108e is not as it is detected by a light detector that a main part of light R1 and R3 does not travel along a desired direction and a part of light R2 does. This means that a first electric field is applied to the first tunable optical material 125a of the first sector 108b and a second electric field is applied to the second tunable optical material 125b of the second sector 108d and no electric field is applied to the third tunable optical material 125c. As shown in FIG. 2(b), as the first and second sectors 108b, 108d are activated, the directors of the corresponding tunable optical materials 125a, 125b are changed so the light R1, R3 generated from the light emitting element 105 will modify the propagation direction and propagate toward an appropriate direction or a predetermined area. The first electric field and the second electric field may be modified in response to a signal generated by a control circuit which is responsive to a signal provided by a light detector. The light detector is operable to detect light generated from the light emitting element 105 and provide a signal to a control circuit so the control circuit may determine whether light R1, R2, R3 generated from the light emitting element 105 propagate along an appropriate direction or toward a predetermined area and control the sectors 108b, 108e, 108d accordingly. For example, since it is detected by the light detector that a part of light R2 transmits along an appropriate direction or toward a predetermined area of the lens, it is determined by the control circuit that the sector 108e reached by light R2 may not be activated and the director of the tunable optical material 125c remains the same. In addition, since it is detected by the light detector that a main part of light R1, R3 that reaches the sectors 108b, 108d of the lens may deviate from the predetermined area, it is determined by the control circuit that both sectors 108b, 108d may need to be activated to change the propagation direction of the light R1, R3.

Figure 3A:
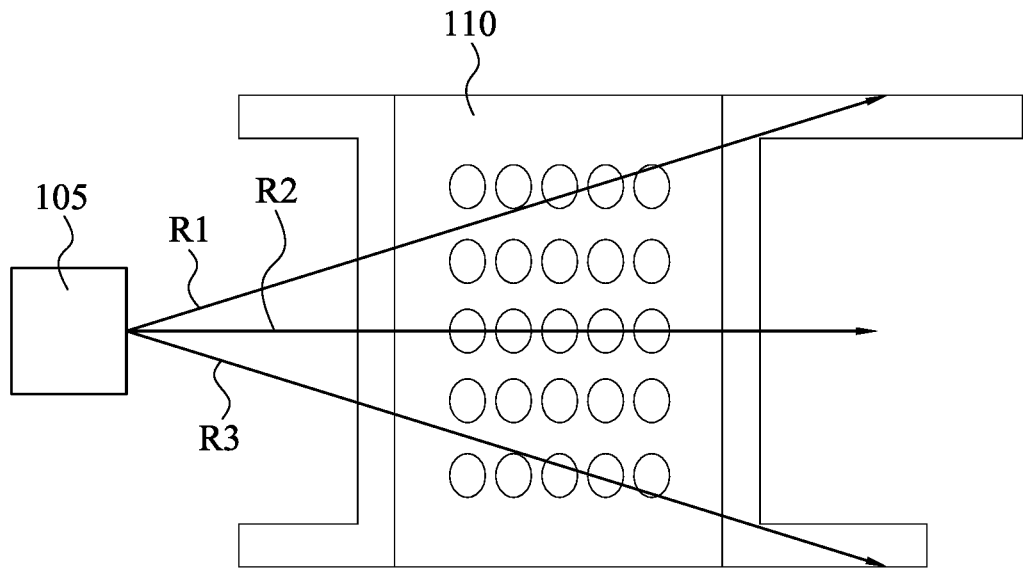
FIG. 3(a) illustrates an enlarged view of a top view of the lens of the device of FIG. 1(a) according to an embodiment of the present disclosure.

FIG. 3(a) illustrates an enlarged view of a top view of the lens 103 of the device 100 of FIG. 1(a) according to an embodiment of the present disclosure, where no sectors are activated, meaning that no electric field is applied to the tunable optical material 110. As shown in FIG. 3(a), since no electric field is applied to the tunable optical material 110, the director of the tunable optical material 110 is not changed, so light R1, R2, R3 generated from the light emitting element 105 will not change the propagation direction and remain the same path. Therefore, light R1, R3 that does not travel along an appropriate direction or toward a predetermined area, e.g., toward the waveguide 107 may not change its path and does not enter the waveguide 107.

Figure 3B:
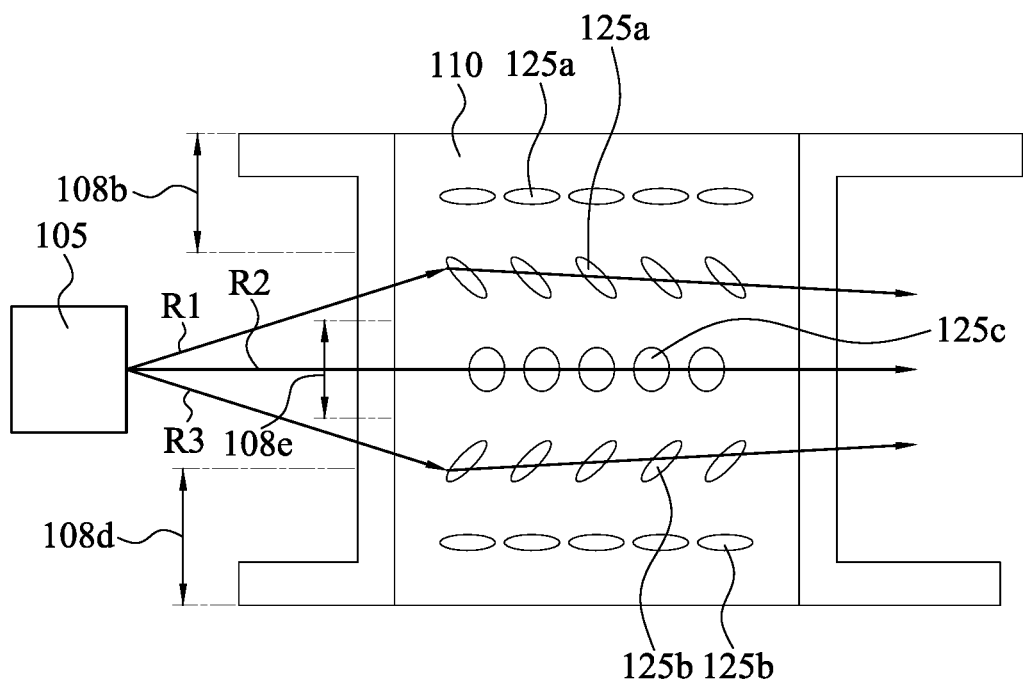
FIG. 3(b) illustrates an enlarged view of a top view of the lens of the device of FIG. 1(a) according to an embodiment of the present disclosure.

FIG. 3(b) illustrates an enlarged view of a top view of the lens 103 of the device 100 of FIG. 1(a) according to an embodiment of the present disclosure, where a first sector 108b and a second sector 108d are activated and a third sector 108e is not as it is detected that a main part of light R1 and R3 does not travel along a desired direction and a part of light R2 does. This means that a first electric field is applied to the first tunable optical material 125a of the first sector 108b and a second electric field is applied to the second tunable optical material 125b of the second sector 108d. As shown in FIG. 3(b), as the first and second sectors 108b, 108d are activated, the directors of the corresponding electrically tunable optical materials 125a, 125b are changed so the light R1, R3 generated from the light emitting element 105 will change the propagation direction and propagate toward an appropriate direction. The first electric field and the second electric field may be modified in response to a signal generated by a control circuit which is responsive to a signal provided by a light detector. The light detector is operable to detect light R1, R2, R3 generated from the light emitting element 105 and provide a signal to a control circuit so the control circuit may determine whether light R1, R2, R3 generated from the light emitting element 105 propagate along an appropriate direction or toward a predetermined area and control the sectors 108b, 108e, 108d accordingly.

For example, since it is detected by the light detector that a part of light R2 transmits along an appropriate direction or toward a predetermined area of the lens, it is determined by the control circuit that the corresponding sector 108e reached by light R2 may not be activated and the director of the tunable optical material 125c remains the same. In addition, since it is detected by the light detector that a main part of light R1, R3 that reaches the sectors 108b, 108d of the lens may deviate from the predetermined area, it is determined by the control circuit that both sectors 108b, 108d may need to be activated to change the propagation direction of the light R1, R3.

Figure 4A:
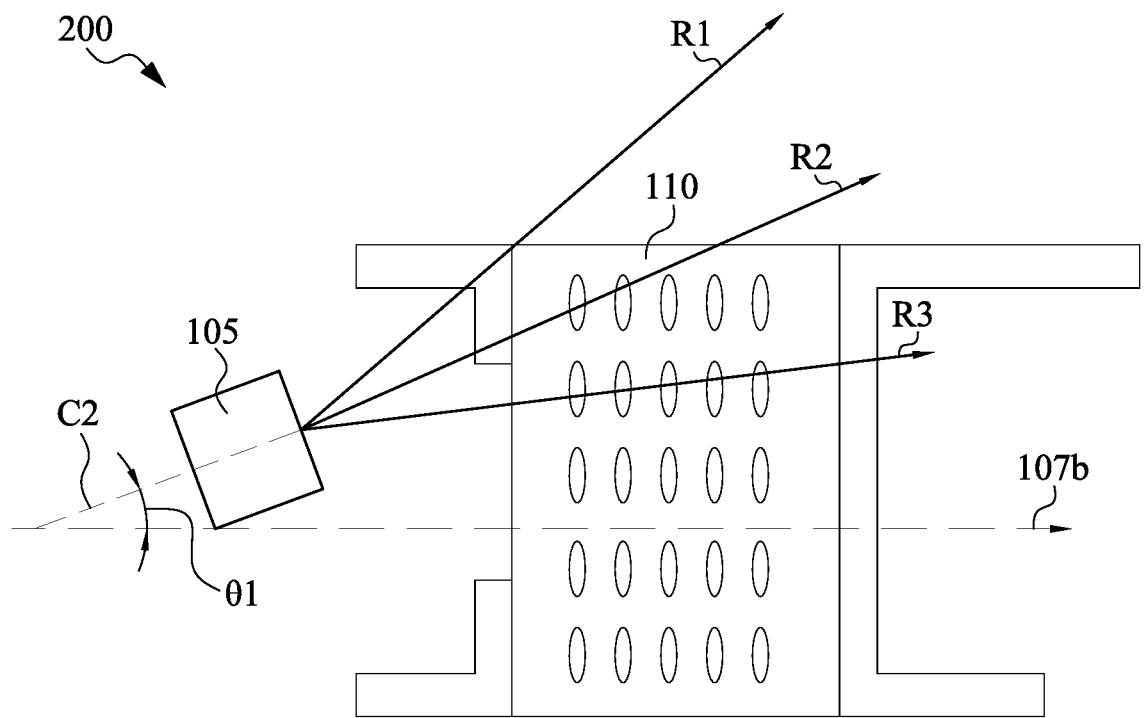
FIG. 4(a) illustrates an enlarged view of a cross-sectional view of an example device according to an embodiment of the present disclosure.

FIG. 4(a) illustrates an enlarged view of a cross-sectional view of an example device 200 according to an embodiment of the present disclosure. The device 200 is similar to that illustrated in FIG. 1(a) and FIG. 1(b), with a difference including that a central axis C2 of the light emitting element 105 may be tilted by an angle θ1 with respect to a line 107b defined by and extending from a bottom surface of the waveguide 107. In this example, when the angle θ1 is positive, it may indicate that the central axis C2 of the light emitting element 105 is tilted upwardly with respect to the waveguide 107. On the other hand, when the angle θ1 is negative, it may indicate that the central axis C2 of the light emitting element 105 is tilted downwardly with respect to the waveguide 107. As shown in FIG. 4(a), when no sectors are activated, meaning that no electric field is applied to the tunable optical material 110, light R1, R2, R3 generated from the light emitting element 105 will not change the propagation direction and remain the same path. Thus, since the light emitting element 105 is not placed at an appropriate position and is tilted, the light R1, R2, R3 generated from the light emitting element 105 may not propagate along an appropriate direction and enter the waveguide 107 effectively.

Figure 4B:
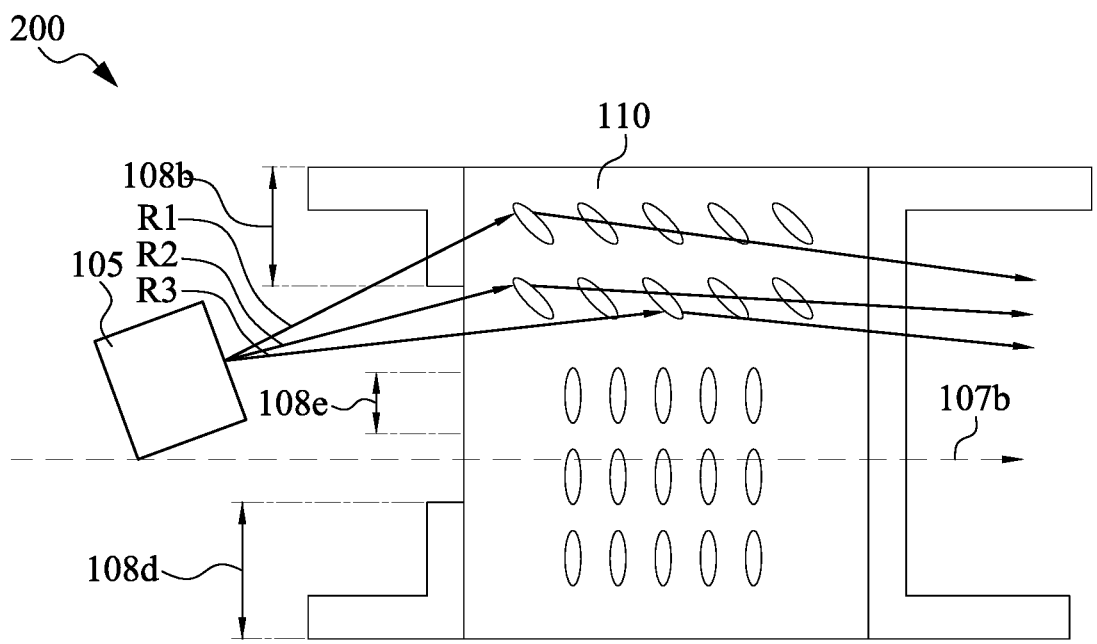
FIG. 4(b) illustrates an enlarged view of a cross-sectional view of an example device according to an embodiment of the present disclosure.

FIG. 4(b) illustrates an enlarged view of a cross-sectional view of an example device 200 according to an embodiment of the present disclosure. The device 200 is similar to that illustrated in FIG. 4(a), with a difference including that a first sector 108b is activated, and a second sector 108d and a third sector 108e are inactivated in response to the signal provided by a control circuit and a light detector, so light R1, R2, R3 generated from the tilted light emitting element 105 will change the propagation direction and propagate toward a required direction. The first electric field in the corresponding first sector 108b may be modified in response to a signal generated by a control circuit which is responsive to a signal provided by a light detector. The light detector is operable to detect light generated from the light emitting element 105 and provide the signal to the control circuit so the control circuit may determine whether light R1, R2, R3 generated from the light emitting element 105 propagate along an appropriate direction and control the sectors 108b, 108e, 108d accordingly. For example, since it is detected by the light detector that a main part of light R1, R2, R3 that reaches the same sector 108b of the lens may deviate from the predetermined area, it is determined by the control circuit that only sector 108b needs to be activated to change the propagation direction of the light R1, R2, R3. Therefore, although the light emitting element 105 is tilted upwardly with respect to the line 107b defined by and extending from the bottom surface of the waveguide 107, light R1, R2, R3 generated from the light emitting element 105 can still enter the waveguide 107 effectively. Therefore, under the circumstances that the light emitting element 105 is not placed precisely, such misalignment may not affect the light coupling efficiency. In addition, since the process window for placing the light emitting element 105 at a predetermined exact position may be increased by such configurations, the calibration processes for precisely placing the light emitting element 105 may be facilitated or simplified, which may improve the process time and improve the throughput of the device.

Figure 5A:
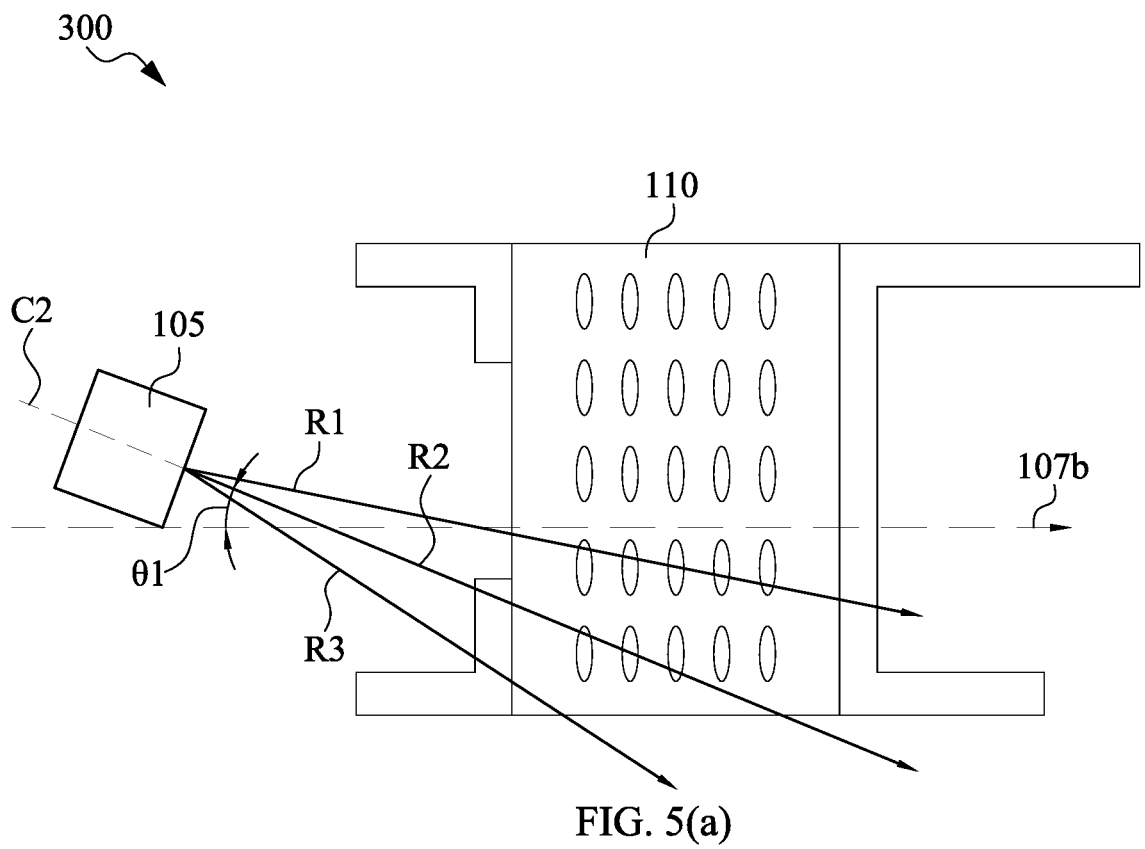
FIG. 5(a) illustrates an enlarged view of a cross-sectional view of an example device according to an embodiment of the present disclosure.

FIG. 5(a) illustrates an enlarged view of a cross-sectional view of an example device 300 according to an embodiment of the present disclosure. The device 300 is similar to that illustrated in FIG. 1(a) and FIG. 1(b), with a difference including that a central axis C2 of the light emitting element may be tilted by an angle θ1 with respect to a line 107b defined by and extending from the bottom surface of the waveguide 107. In this example, when the angle θ1 is negative, it may indicate that the central axis C2 of the light emitting element 105 is tilted downwardly with respect to the waveguide 107. As shown in FIG. 5(a), when no sectors are activated, meaning that no electric field is applied to the tunable optical material 110, light R1, R2, R3 generated from the light emitting element 105 will not change the propagation direction and remain the same path. Thus, since the light emitting element 105 is not placed at an appropriate position and is tilted, a main part of the light R1, R2, R3 generated from the light emitting element 105 may not propagate along appropriate direction and does not enter the waveguide 107.

Figure 5B:
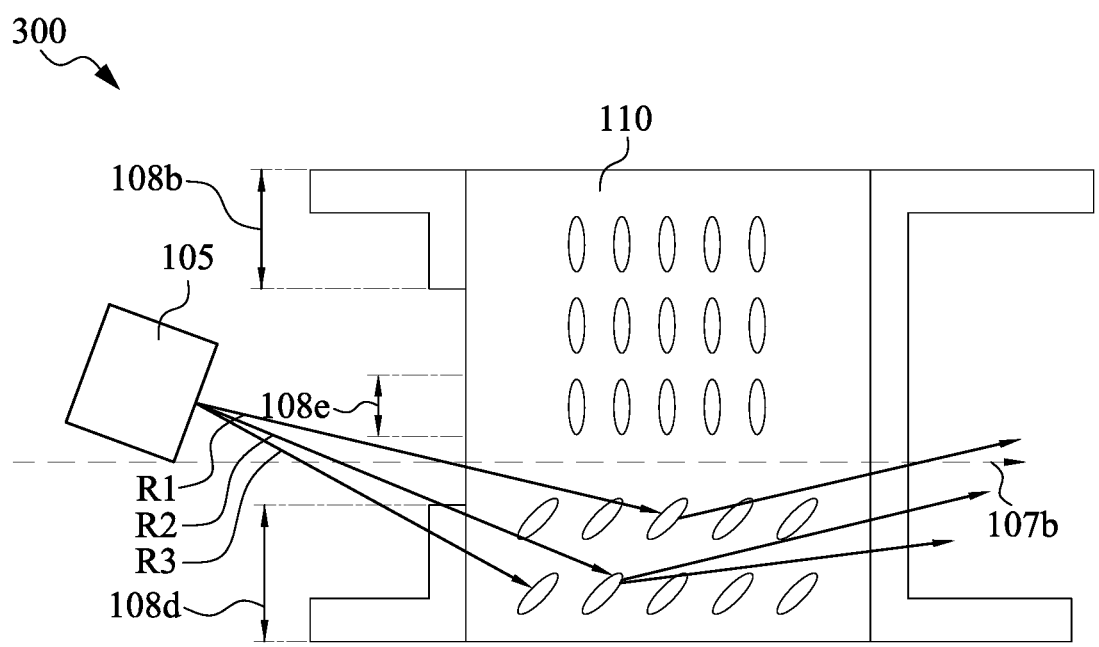
FIG. 5(b) illustrates an enlarged view of a cross-sectional view of an example device according to an embodiment of the present disclosure.

FIG. 5(b) illustrates an enlarged view of a cross-sectional view of a device 300 according to an embodiment of the present disclosure. The device 300 is similar to that illustrated in FIG. 5(a), with a difference including that the second tunable optical sector 108d is activated and the first and third tunable optical sectors 108b, 108e are inactivated in response to the signal provided by a control circuit and a light detector, so light R1, R2, R3 generated from the tilted light emitting element 105 will change the propagation direction and propagate toward a required direction. The second electric field in the corresponding second tunable optical sector 108d may be modified in response to a signal generated by a control circuit which is responsive to a signal provided by a light detector. The light detector is operable to detect light generated from light emitting element 105 and provide a signal to a control circuit so the control circuit may determine whether light R1, R2, R3 generated from the light emitting element 105 propagate along an appropriate direction and control the tunable optical sector 108b, 108e, 108d accordingly. For example, since it is detected by the light detector that a main part of light R1, R2, R3 that reaches the same sector 108d of the lens may deviate from the predetermined area, it is determined by the control circuit that only sector 108d needs to be activated to change the propagation direction of the main part of light R1, R2, R3. Therefore, although the light emitting element 105 is tilted downwardly with respect to the line 107b defined by and extending from the bottom surface of the waveguide 107, a main part of light R1, R2, R3 emitted from the light emitting element 105 can still enter the waveguide 107 effectively. Therefore, under the circumstances that the light emitting element 105 is not placed precisely, such misalignment may not affect the light coupling efficiency. In addition, since the process window for placing the light emitting element 105 at a predetermined exact position may be increased by such configurations, the calibration processes for precisely placing the light emitting element 105 may be facilitated or simplified, which may improve the process time and improve the throughput of the device.

Figure 6A:
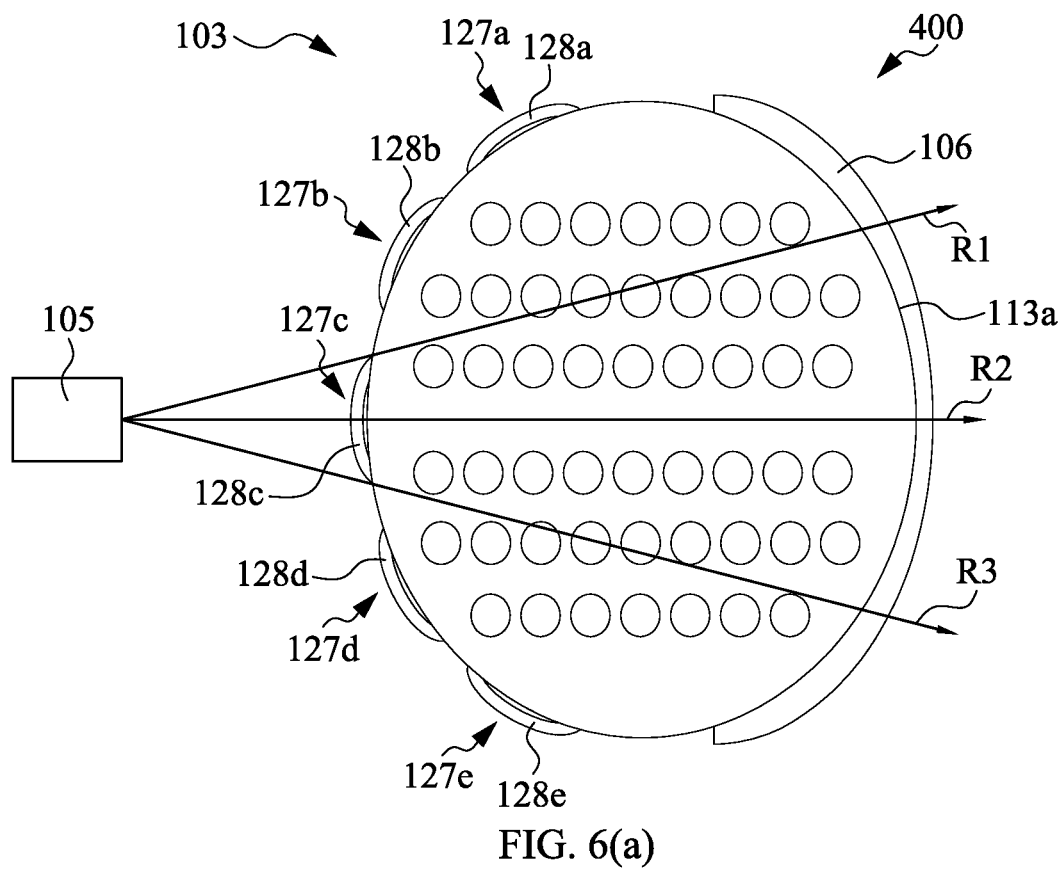
FIG. 6(a) illustrates an enlarged view of a top view of an example device according to an embodiment of the present disclosure.

FIG. 6(a) illustrates an enlarged view of a top view of an example device 400 according to an embodiment of the present disclosure. The device 400 is similar to that illustrated in FIG. 1(a) and FIG. 1(b), with a difference including that the first cavity 113a for disposing the tunable optical material 110 may have a substantially circular shape from top view. The plurality of the first electrodes 128a, 128b, 128c, 128d, 128e may be arranged in the form of an arc, a sphere surface, an ellipse surface, or any combination thereof. As shown in FIG. 6(a), when no sectors 127a, 127b, 127c, 127d, 127e are activated, meaning that no electric field is applied to the tunable optical material 110, light R1, R2, R3 generated from the light emitting element 105 will not change the propagation direction and remain the same path. Therefore, light R1, R3 that does not travel along an appropriate direction or a predetermined area, e.g., toward the waveguide 107 may not change its path and does not enter the waveguide 107.

In some embodiments, the plurality of the sectors 127a, 127b, 127c, 127d, 127e may be arranged and operable in such a manner that light enters the lens 103 may be directed to a focal point or a center of curvature, e.g., to a waveguide, so an electric field to change the director of the tunable optical material 110 may not be necessary.

Figure 6B:
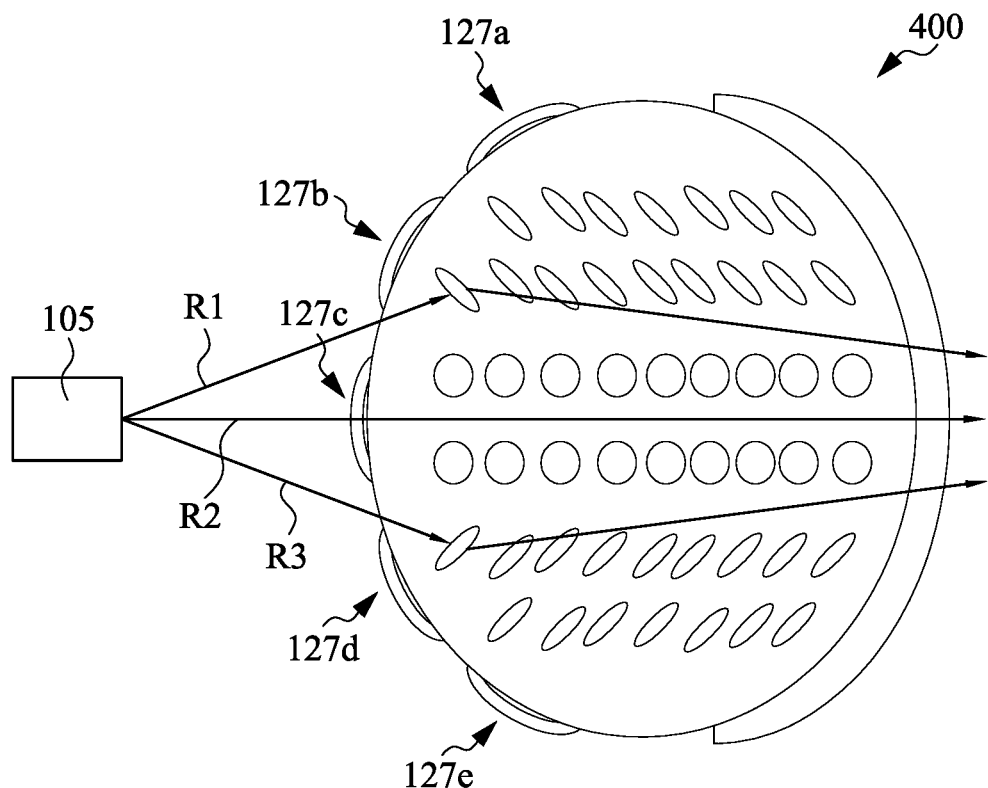
FIG. 6(b) illustrates an enlarged view of a top view of an example device according to an embodiment of the present disclosure.

FIG. 6(b) illustrates an enlarged view of a top view of an example device 400 according to an embodiment of the present disclosure. The device 400 is similar to that illustrated in FIG. 6(a), with a difference including that the first sector 127a, the second sector 127b, the fourth sector 127d, and the fifth sector 127e are activated and the third sector 127c is inactivated, so light R1, R3 generated from the light emitting element 105 will change the propagation direction and propagate toward a required direction, a focal point, a predetermined area, or a center of curvature. The electric fields in the corresponding first sector 127a, second sector 127b, fourth sector 127d, and fifth sector 127e may be modified in response to a signal generated by a control circuit which is responsive to a signal provided by a light detector. The light detector is operable to detect light R1, R2, R3 generated from the light emitting element 105 and provide a signal to a control circuit so the control circuit may determine whether light generated from the light emitting element 105 propagate along an appropriate direction and control the sectors 127a, 127b, 127c, 127d, 127e accordingly. For example, since it is detected by the light detector that a main part of light R1, R3 that reaches the first sector 127a, the second sector 127b, the fourth sector 127d, and the fifth sector 127e of the lens may deviate from the predetermined area, it is determined by the control circuit that these sectors needs to be activated to change the propagation direction of the main part of light R1, R3. Since the process window for placing the light emitting element at a predetermined exact position may be increased by such configurations, the calibration processes for precisely placing the light emitting element 105 may be facilitated or simplified, which may improve the process time and improve the throughput of the device.

Figure 7:
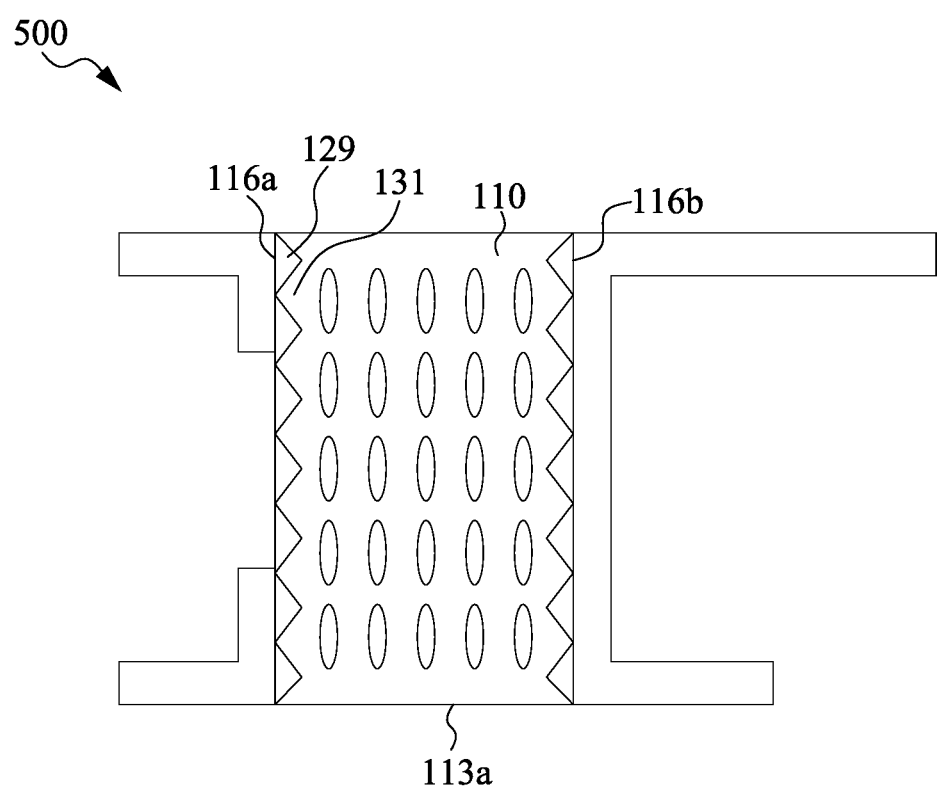
FIG. 7 illustrates an enlarged view of a cross-sectional view of an example device according to an embodiment of the present disclosure.

FIG. 7 illustrates an enlarged view of a cross-sectional view of an example device 500 according to an embodiment of the present disclosure. The device 500 is similar to that illustrated in FIG. 1(a) and FIG. 1(b), with a difference including that at least one alignment structure 129 is disposed adjacent to a sidewall 116a, 116b of the first cavity 113a. The alignment structure 129 may surround at least a portion of a periphery of the first cavity 113a. The alignment structure 129 may surround the periphery of the first cavity 113a entirely. The alignment structure 129 may assist to align the electrically tunable optical materials 110 along a certain direction. In some embodiments, the alignment structure 129 includes at least one trench 131.

Figure 8:
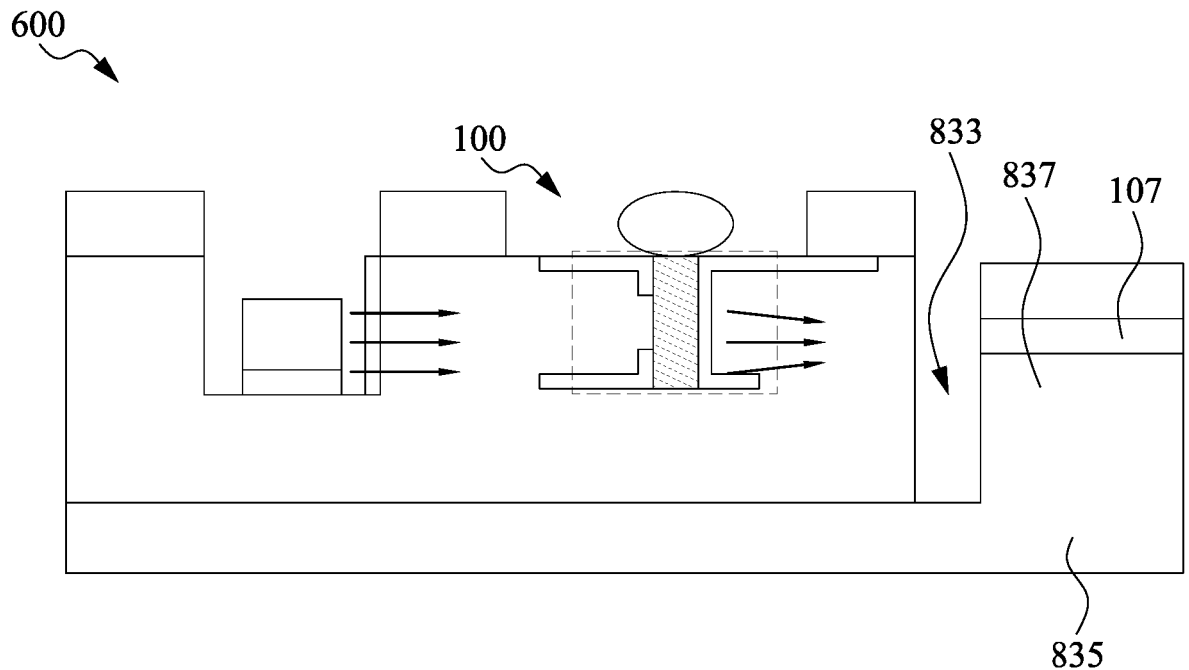
FIG. 8 illustrates a cross-sectional view of an example device according to an embodiment of the present disclosure.

FIG. 8 illustrates a cross-sectional view of an example device 600 according to an embodiment of the present disclosure. As shown in FIG. 8, the device 100 as illustrated in FIG. 1(b) is disposed in a cavity 833 of a substrate 835 and the waveguide 107 is disposed in a portion 837 of the substrate 835. The device 100 is disposed at an appropriate position corresponding to the waveguide 107 in the substrate 835.

Figure 9:
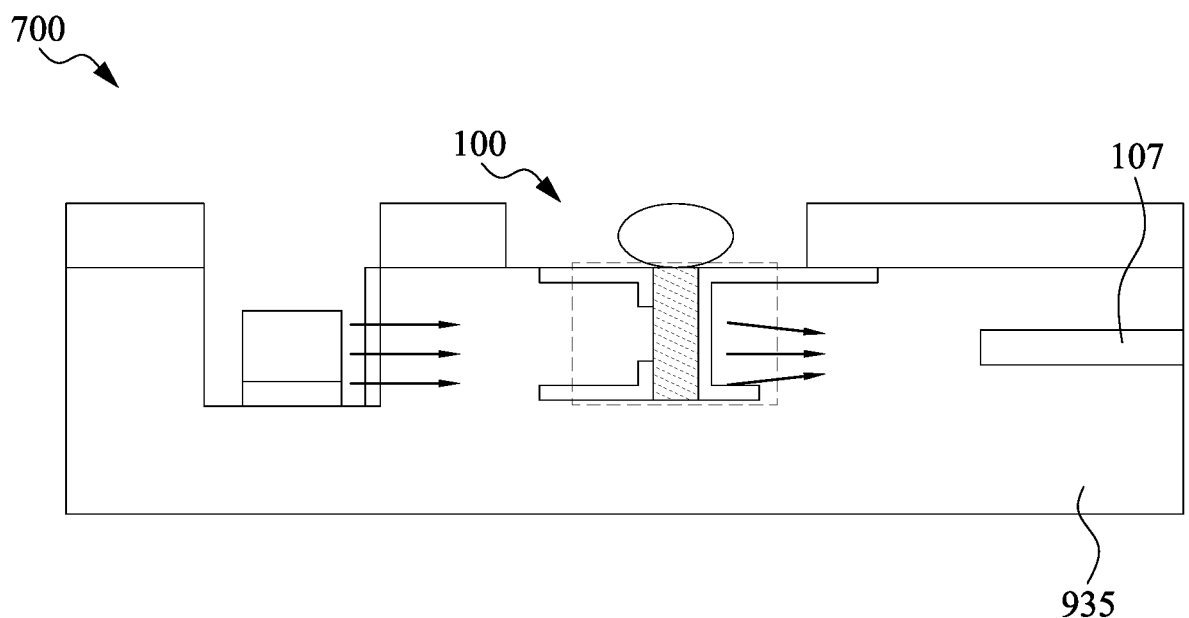
FIG. 9 illustrates a cross-sectional view of an example device according to an embodiment of the present disclosure.

FIG. 9 illustrates a cross-sectional view of the device 700 according to an embodiment of the present disclosure. As shown in FIG. 9, the device 100 as illustrated in FIG. 1(b) and the waveguide 107 are both disposed in the same substrate 935. The device 100 and the waveguide 107 may be embedded in the substrate 935. The device 100 is disposed at an appropriate position corresponding to the waveguide 107 in the substrate 935.

FIGS. 10A-10F illustrate an example method for manufacturing a device according to an embodiment of the present disclosure.

Figure 10A:
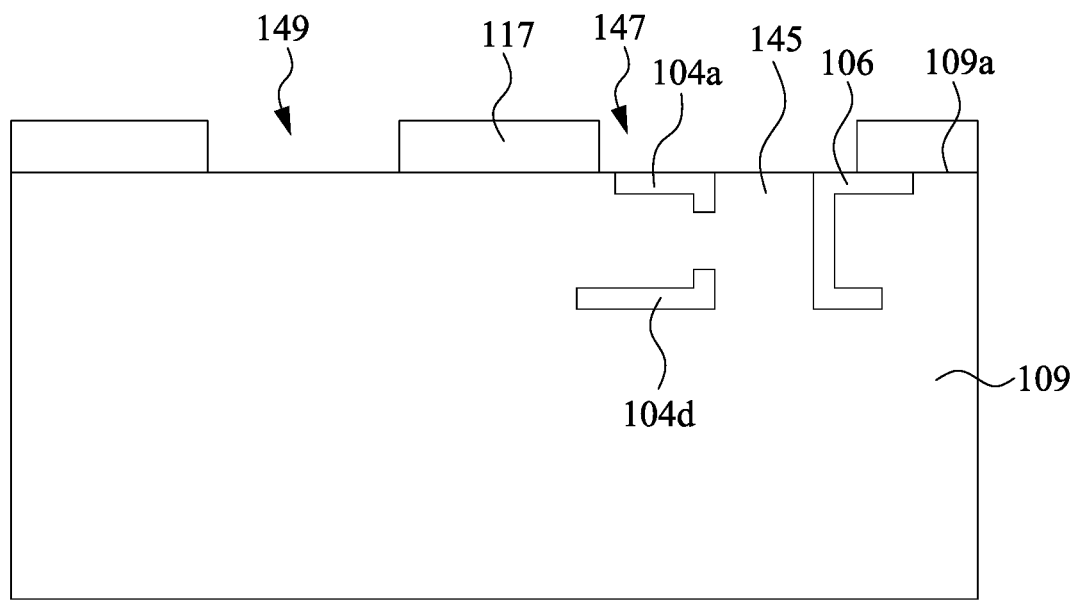
FIG. 10A, FIG. 10B, FIG. 10C, FIG. 10D, FIG. 10E, and FIG. 10F illustrate an example method for manufacturing a device according to an embodiment of the present disclosure.

Referring to FIG. 10A, a substrate 109 is provided. The substrate 109 has a surface 109a. The first electrodes 104a, 104d and the second electrode 106 are disposed in the substrate 109 and surrounding a predetermined position 145 for disposing a tunable optical material. A dielectric layer 117 is disposed adjacent to the surface 109a of the substrate 109 and defining a first opening 147 over the first electrodes 104a, 104d and the second electrode 106 and a second opening 149. The substrate 109 may include silicon, high resistive silicon (undoped silicon), or other suitable materials. The dielectric layer 117 may be disposed by a chemical vapor deposition technique or other suitable techniques. The first electrode 104a, 104d and the second electrode 106 may be disposed by a combination of a photolithography technique, a plating technique, and an etching technique.

Figure 10B:
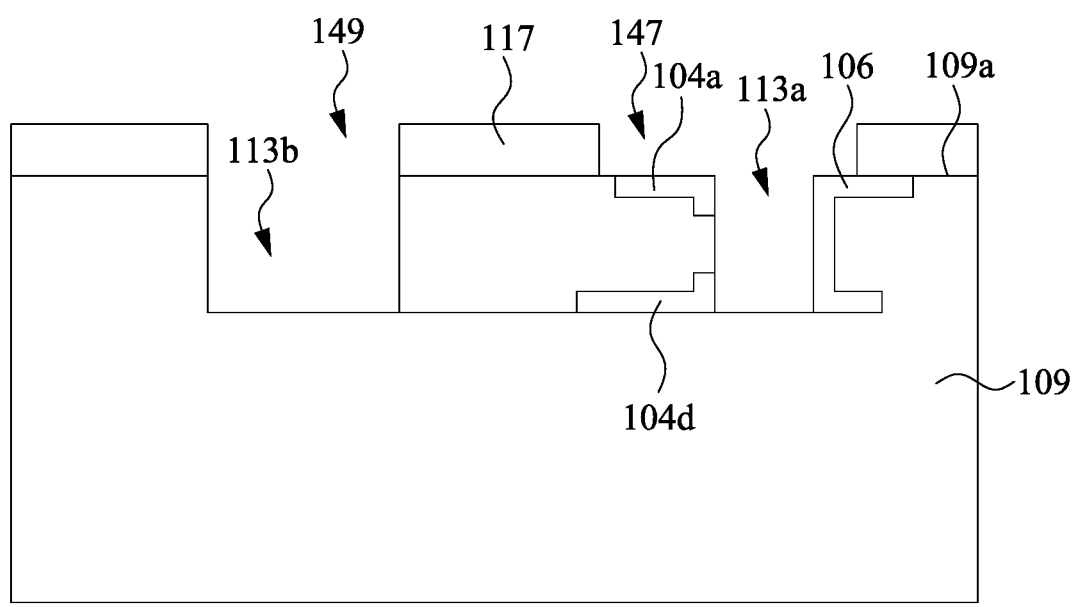

Referring to FIG. 10B, a first cavity 113a and a second cavity 113b are formed at a position corresponding to the first opening 147 and the second opening 149, respectively. The first cavity 113a and the second cavity 113b may be formed by an etching technique. The first cavity 113a may be formed as having a plurality of trenches on a side wall thereof by an etching technique. By disposing the first cavity 113a with at least one trench on the sidewall thereof, an alignment film may not be required in order to align the director of the electrically tunable optical materials 110 along a certain direction in the first cavity 113a.

Figure 10C:
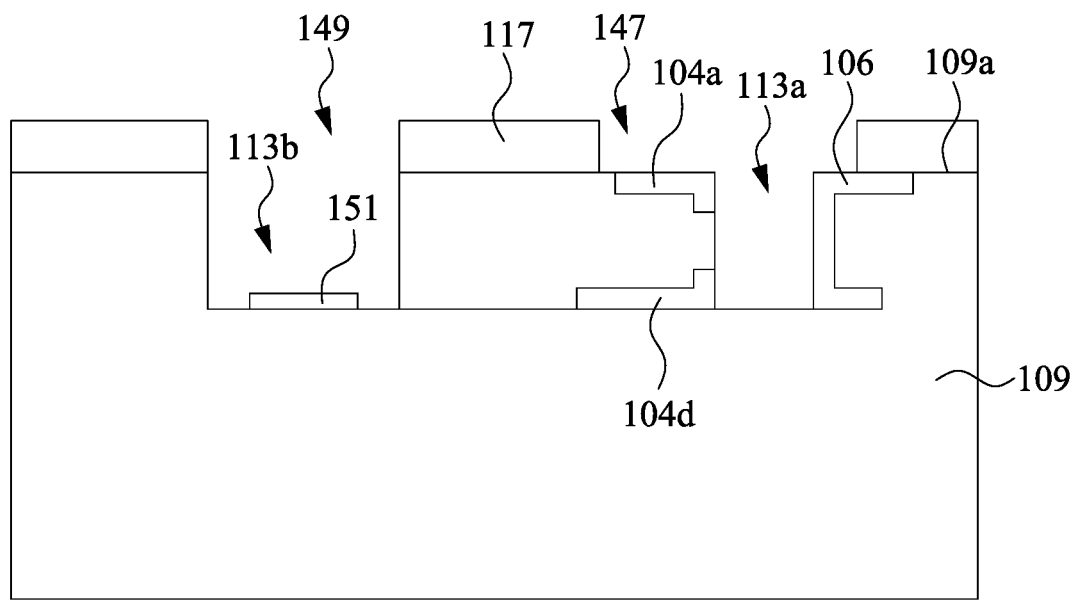

Referring to FIG. 10C, a conductive pattern 151 is disposed in the second cavity 113b. The conductive pattern 151 may be disposed by a combination of a photolithography technique, a plating technique, and an etching technique.

Figure 10D:
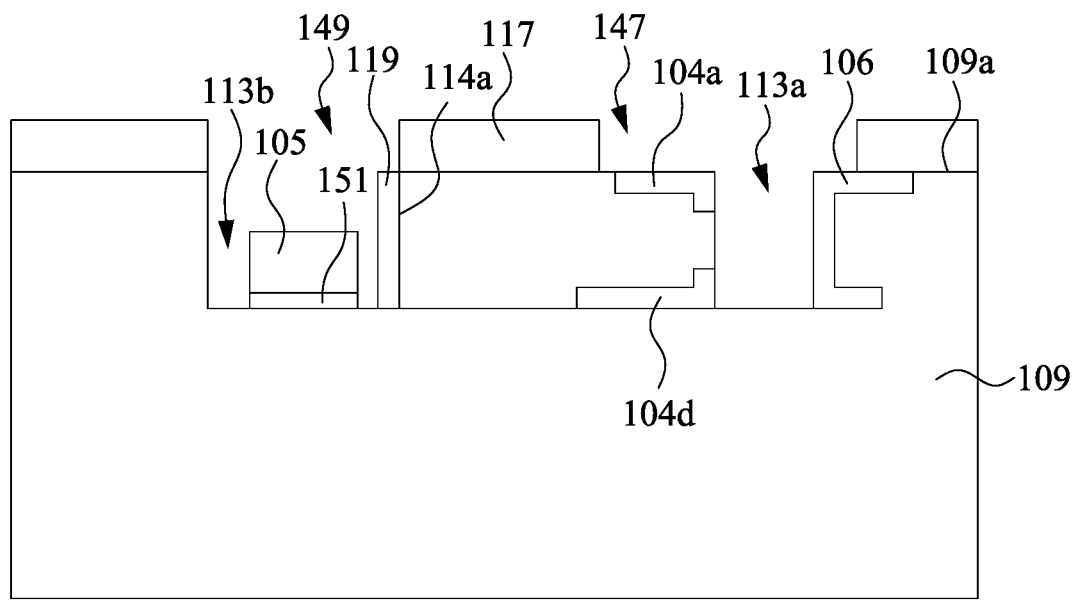

Referring to FIG. 10D, a light emitting element 105 is disposed adjacent to the conductive pattern 151 in the second cavity 113b. A polarizer 119 is disposed adjacent to a sidewall 114a of the second cavity 113b. The light emitting element 105 may be disposed by, for example, a pick and place technique or a bonding technique.

Figure 10E:
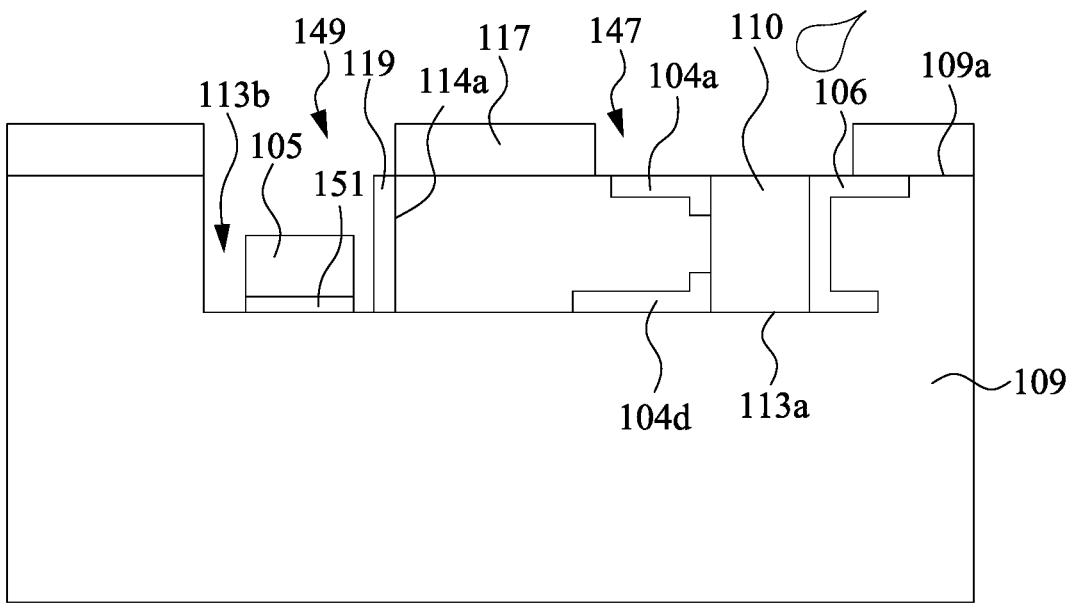

Referring to FIG. 10E, a tunable optical material 110, such as a liquid crystal material, is disposed in the first cavity 113a. The liquid crystal material 110 may be disposed by, for example, a dispensing technique.

Figure 10F:
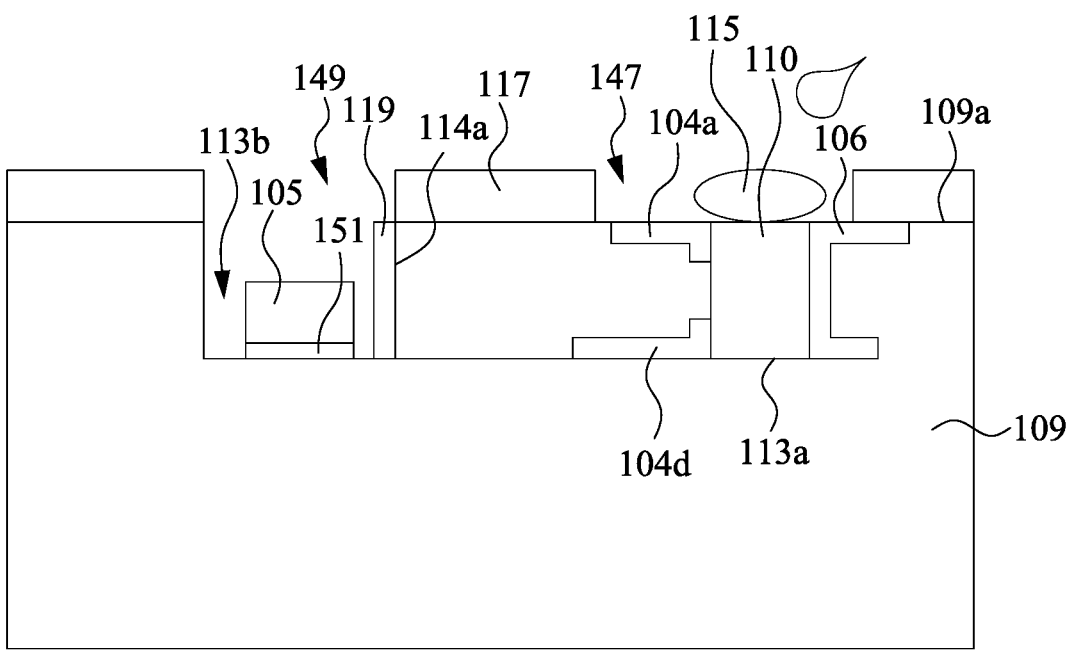

Referring to FIG. 10F, a cover material 115 is disposed over the first cavity 113a and the tunable optical material 110 and seals it. The cover material 115 may be disposed by, for example, a dispensing technique or a sealing technique.

As used herein and not otherwise defined, the terms "substantially" and "about" are used to describe and account for small variations. When used in conjunction with an event or circumstance, the terms can encompass instances in which the event or circumstance occurs precisely as well as instances in which the event or circumstance occurs to a close approximation. For example, when used in conjunction with a numerical value, the terms can encompass a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. As another example, a line or a plane can be substantially flat if a peak or depression of the line or plane is no greater than 5 µm, no greater than 1 µm, or no greater than 0.5 µm.

As used herein, the singular terms "a," "an," and "the" may include plural referents unless the context clearly dictates otherwise. In the description of some embodiments, a component provided "on" or "over" another component can encompass cases where the former component is directly on (e.g., in physical contact with) the later component, as well as cases where one or more intervening components are located between the former component and the latter component.

While the present disclosure has been described and illustrated with reference to specific embodiments thereof, these descriptions and illustrations are not limiting. It should be understood by those skilled in the art that various changes may be made and equivalents may be substituted without departing from the true spirit and scope of the present disclosure as defined by the appended claims. The illustrations may not necessarily be drawn to scale. There may be distinctions between the artistic renditions in the present disclosure and the actual apparatus due to manufacturing processes and tolerances. There may be other embodiments of the present disclosure which are not specifically illustrated. The specification and the drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein have been described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations.

The invention claimed is:

1. A device, comprising:
   a first portion disposed adjacent to a surface of a substrate, the first portion having a first side and a second side opposite to the first side;
   a second portion disposed adjacent to the surface of the substrate and a cavity is disposed between the first portion and the second portion;
   a lens disposed adjacent to the first side of the first portion;
   a light emitting element disposed adjacent to the second side of the first portion;
   a waveguide, wherein the lens is disposed in the cavity between the light emitting element and the waveguide;
   a first electrode disposed between the first portion and the second portion; and
   a second electrode disposed in the second portion,
   wherein the lens is operable to converge light emitted from the light emitting element when a voltage is applied to the lens by the first and second electrodes and the lens is a liquid crystal lens.

2. The device of claim 1, wherein a plurality of the first electrodes are disposed in the first portion and surrounding at least a portion of a periphery of the cavity.

3. The device of claim 1, further comprising an alignment structure disposed on a sidewall of the cavity.

4. The device of claim 3, wherein the alignment structure surrounds at least a portion of a periphery of the cavity.

5. The device of claim 4, wherein the alignment structure includes a plurality of trenches and at least one of the trenches surrounds at least a portion of the periphery of the cavity.

6. The device of claim 1, further comprising a cover material disposed over the cavity.

7. The device of claim 6, further comprising a dielectric layer disposed adjacent to a surface of the first portion and a surface of the second portion and exposing the cover material.

8. A device, comprising:
   a light emitting element embedded in a first cavity of a substrate;
   a lens embedded in a second cavity of the substrate, wherein the lens is adjustable to converge light emitted by the light emitting element into a predetermined portion of the lens;
   a waveguide;
   a plurality of first electrodes disposed adjacent to a first side of the second cavity; and
   a second electrode disposed adjacent to a second side of the second cavity opposite to the first side, wherein the lens converges the light into a predetermined area substantially aligned with a light receiving area of the waveguide, and the lens comprises a liquid crystal module comprising a plurality of pixels operable to converge the light into the light receiving area of the waveguide.

9. The device of claim 8, wherein the predetermined portion of the lens corresponds to a portion of the lens reached by a main part of the emitted light.

10. The device of claim 8, further comprising a control circuit operable to control the predetermined portion of the lens for converging light.

* * * * *